(12) United States Patent
Borgmann et al.

(10) Patent No.: US 6,576,889 B2
(45) Date of Patent: Jun. 10, 2003

(54) ANGLE SENSOR

(75) Inventors: Uwe Borgmann, Recklinghausen (DE); Dirk Schmidt, Wipperfürth (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 46 days.

(21) Appl. No.: 09/894,694

(22) Filed: Jun. 28, 2001

(65) Prior Publication Data
US 2002/0070336 A1 Jun. 13, 2002

(30) Foreign Application Priority Data
Jun. 30, 2000 (DE) .......................................... 100 31 969

(51) Int. Cl.⁷ ................................................ G01D 5/34
(52) U.S. Cl. .............................. 250/231.13; 250/231.18
(58) Field of Search ....................... 250/231.13, 231.14, 250/231.15, 231.16, 231.17, 231.18, 232, 233; 341/13; 701/41; 180/400

(56) References Cited

U.S. PATENT DOCUMENTS 5,734,160 A * 3/1998 Chung et al. .......... 250/231.13
6,410,909 B1 * 6/2002 Rudolph et al. ....... 250/231.13

FOREIGN PATENT DOCUMENTS

EP          0 774 648 A1     5/1997

* cited by examiner

Primary Examiner—Kevin Pyo
(74) Attorney, Agent, or Firm—Brooks & Kushman P.C.

(57) ABSTRACT

An angle sensor with a fixed stator and a rotor rotating about an axis of rotation in which the stator has optical sensor elements being aligned in a plane vertical to the axis of rotation on a circular line in the perimeter direction concentric to the axis of rotation and being distributed across a range of perimeter angle. The sensor sensor elements cooperate with the rotor coding. The angle sensor solves the technical problem of ensuring that mechanical tolerances will not adversely impact operation of the sensor. This problem is solved in that the longitudinal axes of the sensor elements are not aligned radial to the circle line on which these units are positioned in the perimeter direction, but rather are aligned parallel to each other.

11 Claims, 2 Drawing Sheets

ANGLE SENSOR

BACKGROUND OF THE INVENTION

1. Field of the Invention

The invention pertains to an angle sensor with a fixed stator and a rotor rotating about an axis of rotation, where the stator has several optical-electronic sensor elements, each having the same design, being aligned in a plane vertical to the axis of rotation on a circular line in the perimeter direction concentric to the axis of rotation and being distributed across a range of perimeter angle, where said sensor elements cooperate with the coding provided on the rotor.

In particular, the invention pertains to an angle sensor for use in a steering device of a motor vehicle.

2. Background Art

Document EP 774 648 A1 describes an angle sensor of the kind referenced above, with a code ring with n, where n>1, code ring segments having the same geometric design, each having the same coding, where the sensor elements and each code ring segment extend across a range of perimeter angle of 360°/n.

In the illustrated design example of this kind of sensor device, there are six optical-electronic sensor elements formed as bifurcated light barrier units each having the same spacing from each other and positioned on a perimeter angle range of 72°, where five code ring segments having the same coding, in conjunction with the six sensor elements, produce a one-step, linked, six-bit-code, so that the angular position within a segment can be unambiguously determined.

The device operates very precisely and dependably in a low-tolerance mechanical structure; however, certain deviations from the ideal configuration, such as a radial offset of rotor and stator with respect to each other, or a deviation of the track formed by the sensor elements from the factory-installed circular line, will allow the device to operate with correct measured results only along a limited perimeter.

SUMMARY OF THE INVENTION

Therefore, the problem of the present invention is to refine this kind of sensor device so that even greater mechanical tolerances can be accepted, such as those required due to the integration of the sensor device into a higher-order structural unit having several components, such as a steering column switch, for example, and/or a volute spring cassette as a kind of steering column tube switch module, and so that still a dependable function of the device will be assured.

This problem is solved according to this invention, in that the longitudinal axes of the optical-electronic sensor elements (i.e. in the case of the bifurcated light barrier units, for example, the connecting lines between an optical-electronic transmitter and the receiver allocated to it) are not arranged radial to the circular line on which these units are positioned in the perimeter direction, but rather are parallel to each other.

BRIEF DESCRIPTION OF THE DRAWINGS

Favorable embodiments of the invention are indicated from the following description of a preferred design example.

DETAILED DESCRIPTION OF THE PREFERRED EMBODIMENT(S)

Figure 1:
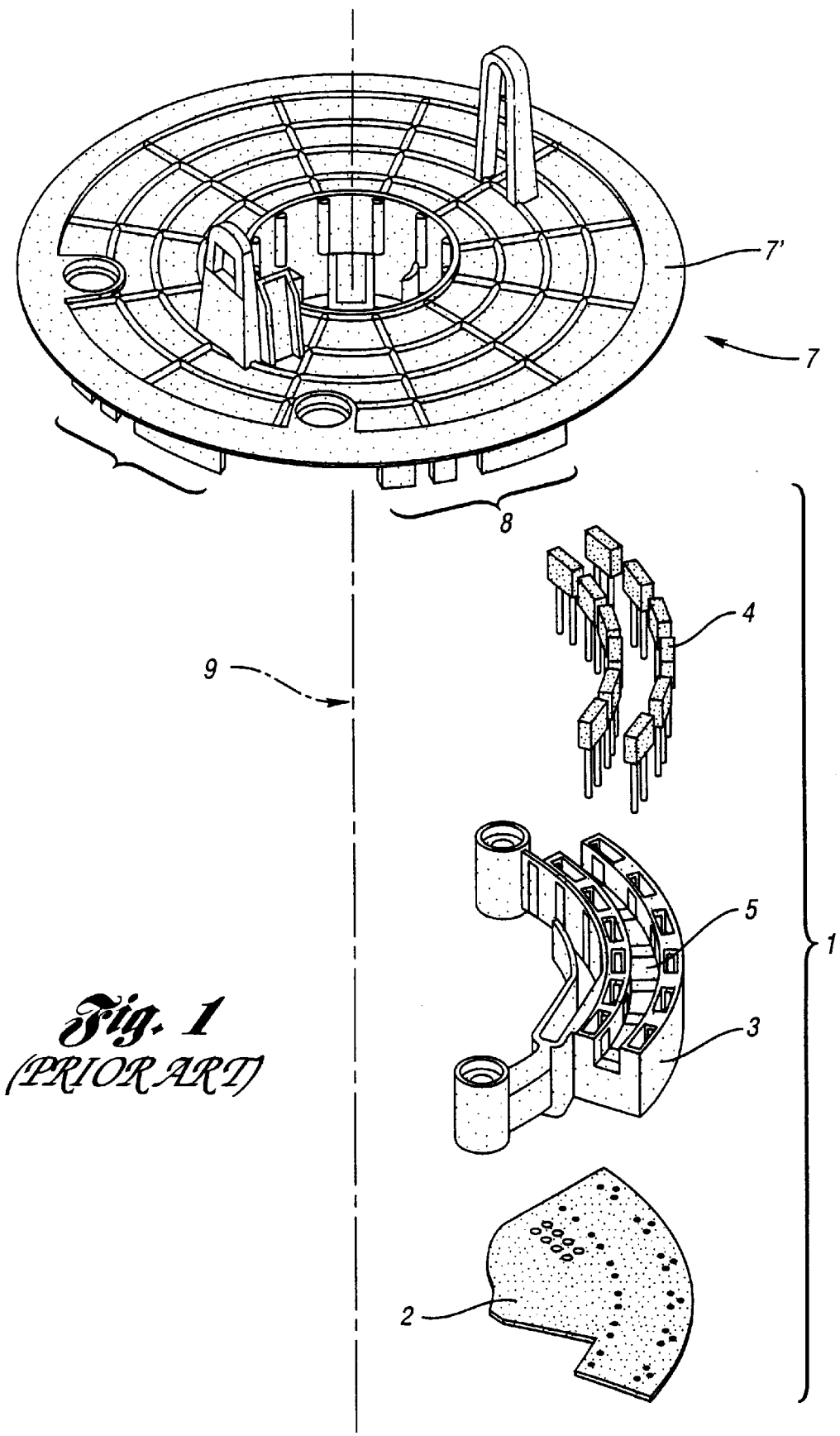
FIG. 1 is an exploded representation of a state-of-the-art angle sensor.

The angular sensor according to this invention has essentially the same structure as the state of the art sensor illustrated in FIG. 1. In this case, a stator 1 is secured to the steering unit or to the steering column tube. The stator 1 has a circuitboard 2 which is designed as a segment and which extends across a perimeter angle of 72°=360°/5, and also a ring segment housing 3 aligned on the circuitboard 2 and extending across a perimeter angle of 72° to hold six sensor elements 4; these sensor elements are positioned at equal angular intervals of 12°. And are designed as bifurcated light barrier units. The transmitter elements and receiver elements of the bifurcated light barrier units are contacted directly with the circuitboard 2 and rest opposite each other on different sides of a ring gap 5 which is aligned concentric to the axis of rotation 9 of the steering wheel shaft.

Figure 2:
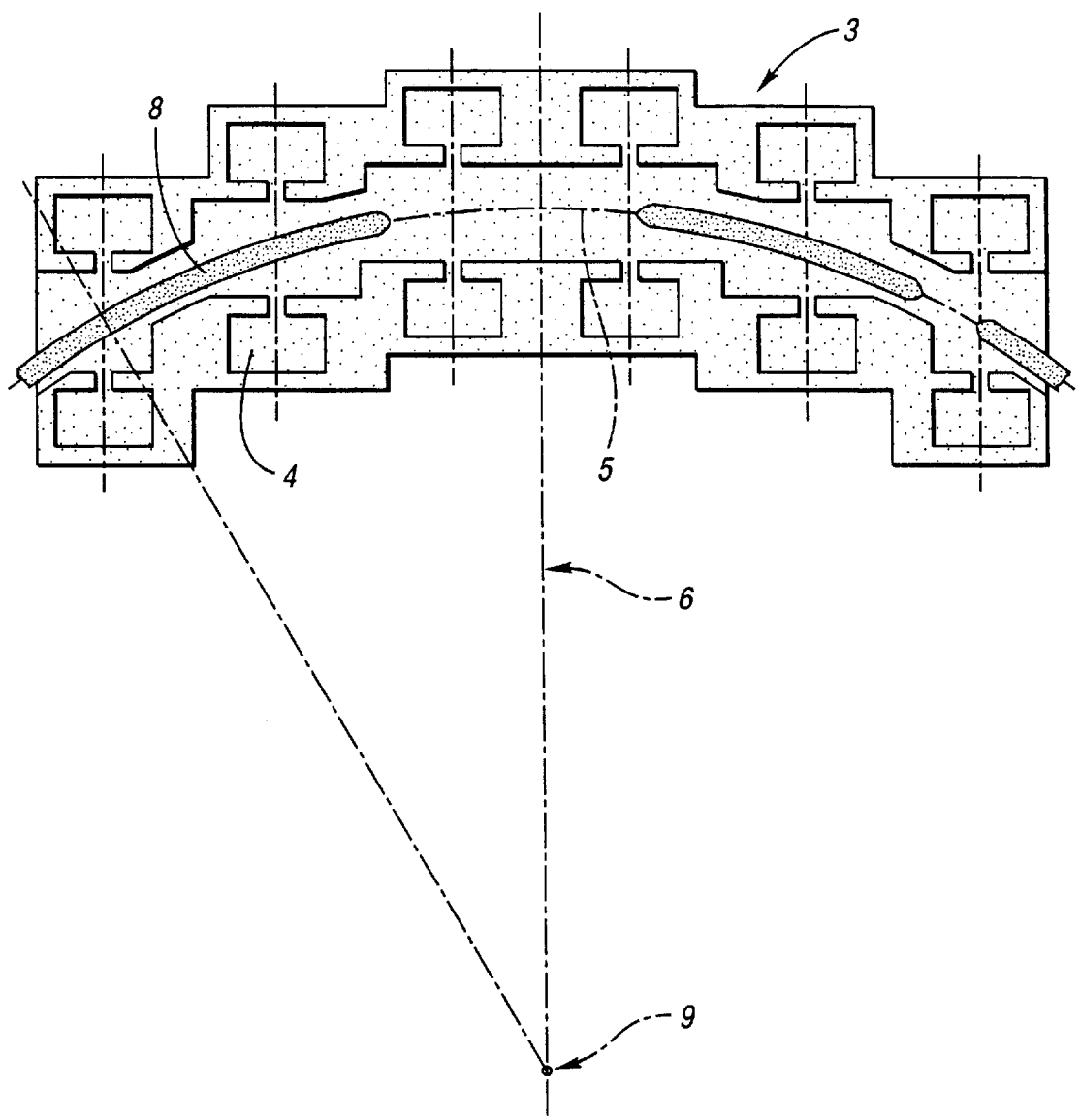
FIG. 2 is a detailed illustration of the arrangement of the optical-electronic sensor elements according to this invention, shown in cross section.

The sensor elements 4, as is visible in the cut-away illustration of the ring segment housing 3 presented in FIG. 2, have their longitudinal axes (meaning the connecting line between their transmitter and receiver elements) positioned not radial to the circular line, but rather positioned parallel to each other, which causes a significant improvement in device insensitivity to mechanical tolerances caused by radial alignment. The positioning of the sensor elements 4 in this example is chosen as mirror-symmetrical to a diameter line 6 running through the axis of rotation 9.

A rotor disk is coupled to the steering wheel shaft and is designed as a code ring 7 with five equal, aperture-shaped code ring segments 8 each extending across a perimeter angle of 72°. The code ring segments 8 are moved through the ring gap 5 during the rotation of the code ring 7. The code ring segments 8, in conjunction with the sensor elements 4, generate a one-step, linked code. In the case illustrated here with six light barriers, we will have a six-bit code.

The one-step, linked code makes possible a precise determination of position, due to progressive counting of the code ring segments 8, even over several rotations of the steering wheel shaft. A reference value is obtained independently of the angle sensor by means of a synchronous measurement of the vehicle wheels, by a rotation of the steering wheel shaft across the entire steering range, or by another initializing method.

For an unambiguous identification of the code ring segments 8 and thus for an absolute angle measure across one full circular perimeter, the code ring segments 8 can have a different light transmissivity which is measured in analog format by the light barriers. Thus, the particular steering angle can be determined unambiguously and absolutely along the entire circular perimeter of 360°.

The angle sensor according to this invention is a constituent of a so-called steering column tube switch module, which contains, along with other components, a volute spring cassette.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An angle sensor comprising:
   a rotor rotatable about an axis of rotation, the rotor having a plurality of code ring segments each having coding;

a fixed stator having a circular ring segment housing provided with a circular ring segment gap, the circular ring segment housing positioned on a circular perimeter segment extending concentrically along a perimeter angle segment around the axis of rotation of the rotor, wherein the code ring segments traverse through the circular ring segment gap as the rotor rotates about the axis of rotation; and a plurality of sensor elements each having an optical transmitter and an optical receiver, wherein the sensor elements are distributed along the perimeter angle segment on the circular ring segment housing such that the transmitter and receiver of each sensor element lie opposite from one another across the circular ring segment gap on a longitudinal axis and the longitudinal axes of the sensor elements are aligned parallel with respect to each other, wherein the sensor elements cooperate with the coding of the code ring segments as the code ring segments traverse through the circular ring segment gap as the rotor rotates about the axis of rotation to provide an indication of the angle of a selected point of the rotor.

2. The angle sensor of claim 1 wherein:

the sensor elements are positioned mirror-symmetrical to a diameter line running through the axis of rotation of the rotor and the longitudinal axes of the sensor elements are aligned parallel with the diameter line.

3. The angle sensor of claim 1 wherein:

the sensor elements have the same angular spacing between each other.

4. The angle sensor of claim 1 wherein:

the stator has an electronic circuit board positioned on the circular perimeter segment and associated with the circular ring segment housing for holding the sensor elements.

5. The angle sensor of claim 1 wherein:

the sensor elements are bifurcated light barrier units and the code ring segments are code ring aperture segments.

6. The angle sensor of claim 1 wherein:

the code ring segments are code reflection ring segments and the sensor elements are reflection light barrier units.

7. The angle sensor of claim 1 wherein:

the coding of the code ring segments has n, where n>1, coding segments, wherein each code ring segment extends across an angular range equal to the angular range of the perimeter angle segment.

8. The angle sensor of claim 1 wherein:

the code ring segments in conjunction with m sensor elements causes a one-step, linked m-bit code.

9. The angle sensor of claim 1 wherein:

the angular range of the perimeter angle segment is 72°.

10. The angle sensor of claim 9 wherein:

the plurality of sensor elements is six sensor elements.

11. An angle sensor for determining the angle of rotation of a motor vehicle steering device, the angle sensor comprising:

a rotor attached to a steering wheel shaft of a steering device rotatable about an axis of rotation, the rotor having a plurality of code ring segments each having coding;

a stator attached to a fixed steering column of the steering device, the stator having a circular ring segment housing provided with a circular ring segment gap, the circular ring segment housing positioned on a circular perimeter segment extending concentrically along a perimeter angle segment around the axis of rotation of the rotor, wherein the code ring segments traverse through the circular ring segment gap as the rotor rotates about the axis of rotation; and a plurality of sensor elements each having an optical transmitter and an optical receiver, wherein the sensor elements are distributed along the perimeter angle segment on the circular ring segment housing such that the transmitter and receiver of each sensor element lie opposite from one another across the circular ring segment gap on a longitudinal axis and the longitudinal axes of the sensor elements are aligned parallel with respect to each other, wherein the sensor elements cooperate with the coding of the code ring segments as the code ring segments traverse through the circular ring segment gap as the rotor rotates about the axis of rotation to provide an indication of the angle of a selected point of the steering wheel device.

* * * * *